(No Model.)  J. A. TATRO.  3 Sheets—Sheet 1.
FURNACE FOR ANNEALING GLASS AND TREATING, ANNEALING, AND TEMPERING METALS.
No. 308,009.  Patented Nov. 11, 1884.
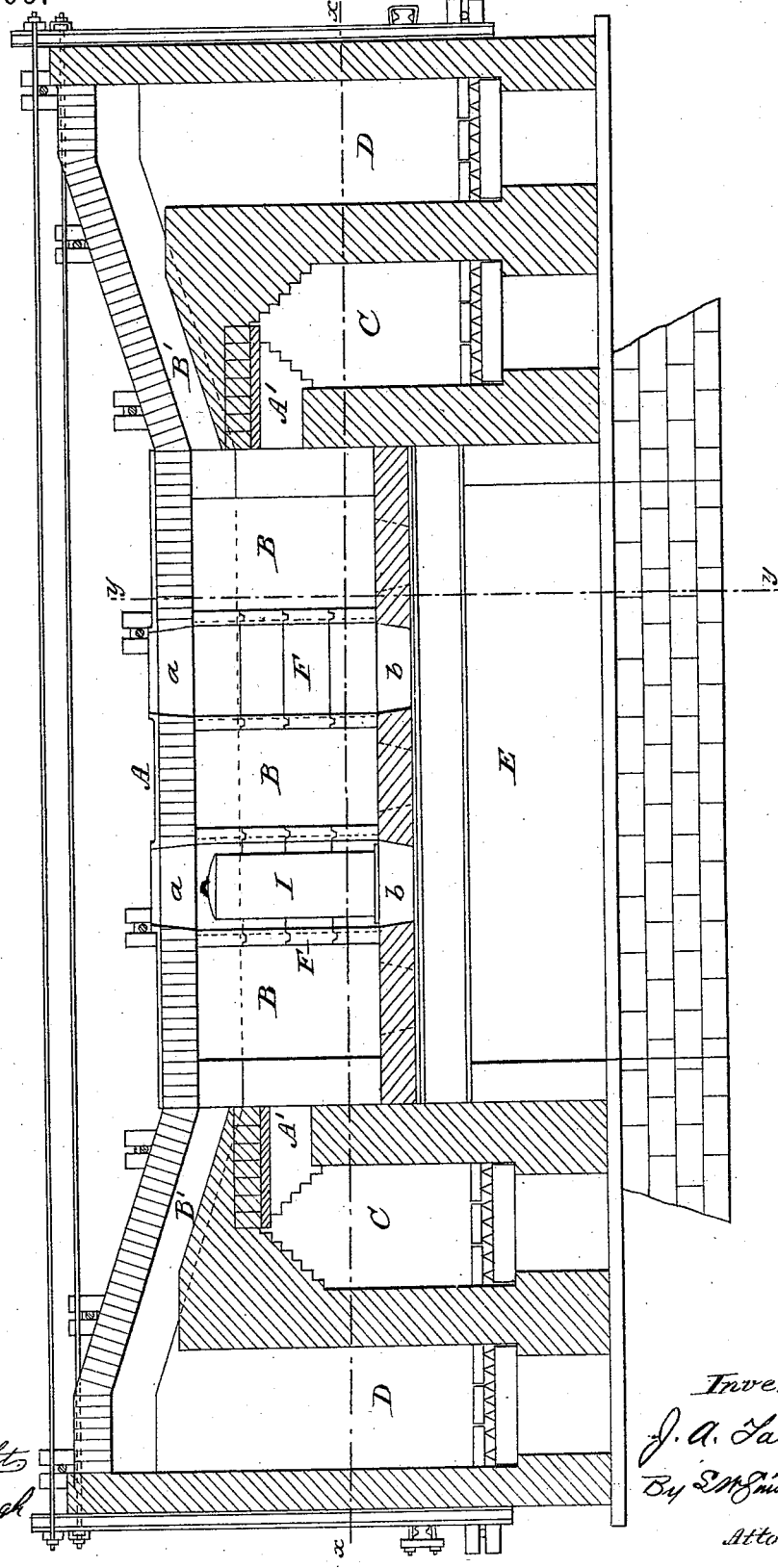

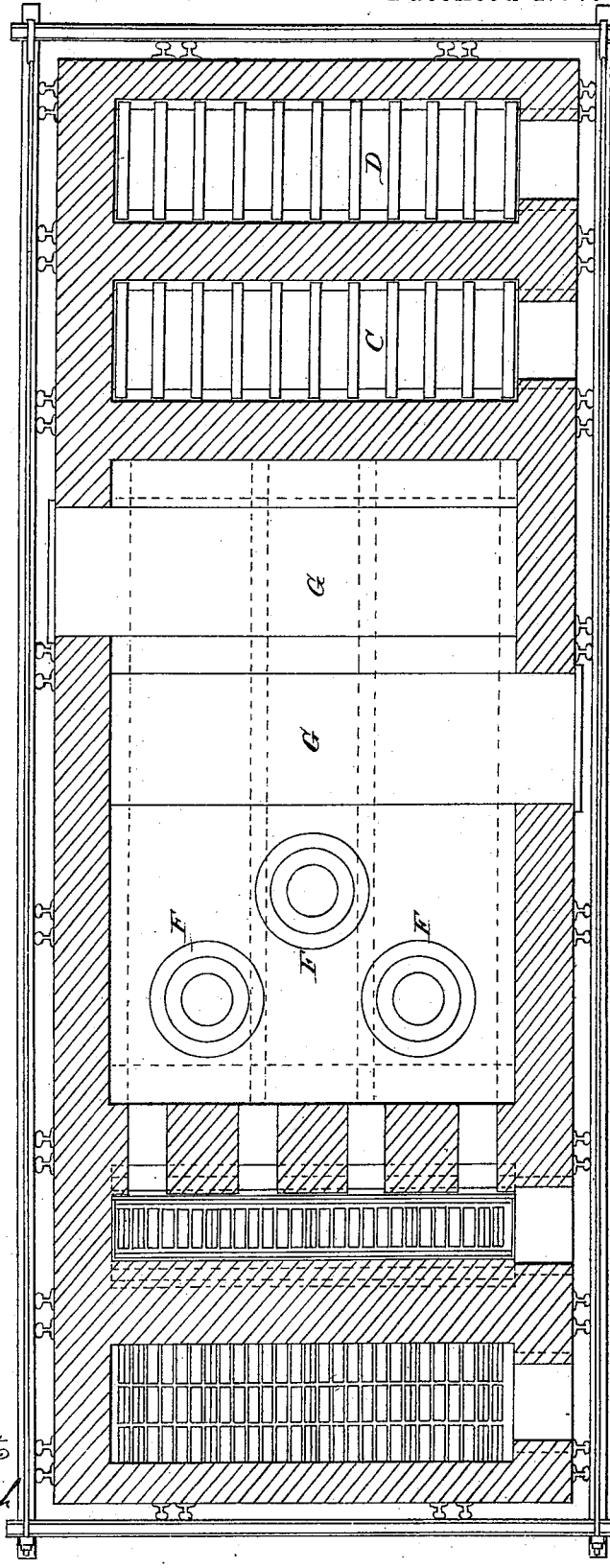

(No Model.)
3 Sheets—Sheet 3.
J. A. TATRO.
FURNACE FOR ANNEALING GLASS AND TREATING, ANNEALING, AND TEMPERING METALS.
No. 308,009. Patented Nov. 11, 1884.
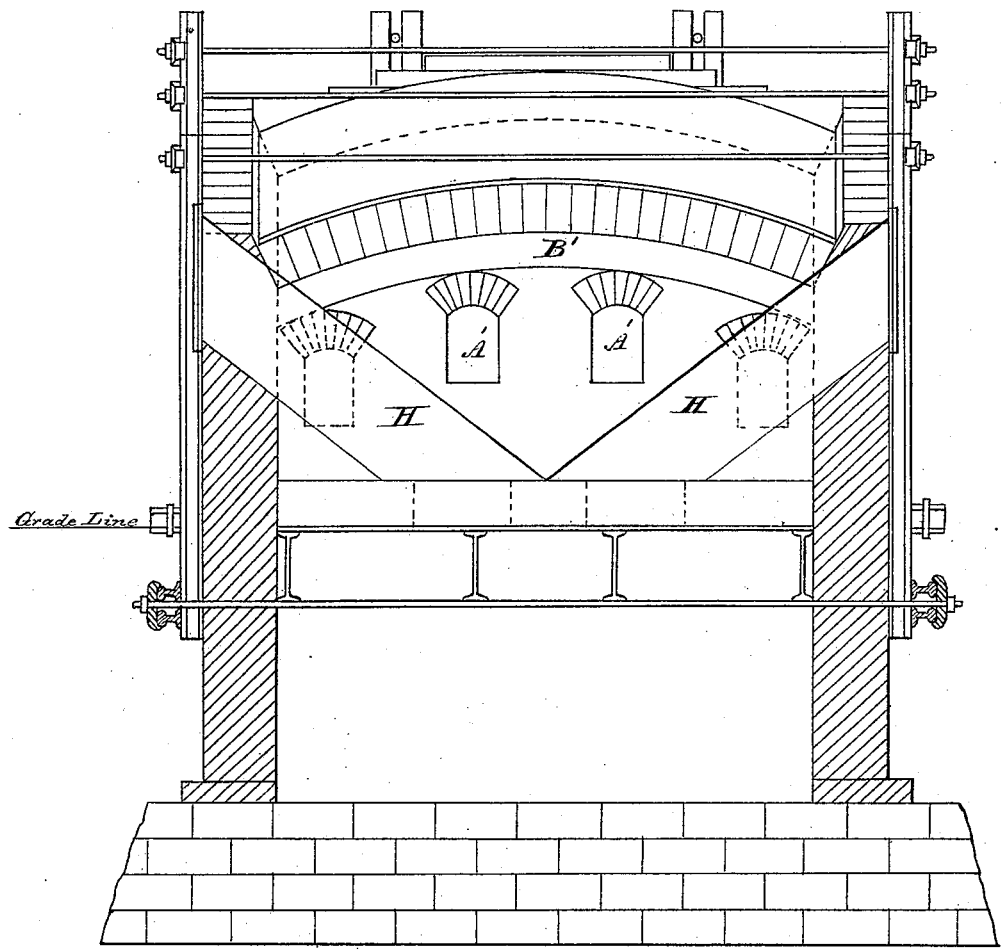

UNITED STATES PATENT OFFICE.

JOSEPH A. TATRO, OF BEAVER FALLS, PENNSYLVANIA.

FURNACE FOR ANNEALING GLASS AND TREATING, ANNEALING, AND TEMPERING METALS.

SPECIFICATION forming part of Letters Patent No. 308,009, dated November 11, 1884.

Application filed September 8, 1884. (No model.)

*To all whom it may concern:*

Be it known that I, J. A. TATRO, a citizen of the United States, residing at Beaver Falls, in the county of Beaver and State of Pennsylvania, have invented certain new and useful Improvements in Furnaces for Annealing Glass and Treating, Annealing, and Tempering Metals, of which the following is a specification, reference being had therein to the accompanying drawings.

My invention relates to improvements in furnaces for annealing glass and for the treatment of metals when heated.

The object of my invention is to provide a furnace which will be continuous in its operations of annealing and tempering, and at the same time exclude the air from the articles which are being treated, and thus prevent the same from oxidizing.

My invention consists in the employment of a regenerative furnace for the annealing, tempering, and treating of glass, metals, &c., whereby the articles to be treated can be subjected to a high and uniform degree of heat.

My invention consists, further, in dividing the combustion or heating chamber of a regenerative furnace into a series of chambers or compartments, into which the articles to be treated are placed, the walls of said chambers being composed of fire-clay or other heat-resisting material.

My invention consists, further, in placing the chambers within the combustion or heating chamber of the regenerative furnace in a vertical, horizontal, or inclined position, said chambers being provided with openings at one or both ends, as will more fully appear.

My invention consists, further, in adapting one end of the chambers to receive the flasks or boxes in which the articles are heated, while the other end is arranged to admit of the passage therethrough of the flasks or boxes, so that the articles can be heated in a short time to the required temperature, and then removed in the flasks or boxes to the soaking-pit, where they are covered with sand in the usual manner and allowed to gradually cool down.

My invention consists, further, in certain details of construction, which will be fully described hereinafter, and pointed out in the claims.

Referring to the drawings, Figure 1 is a vertical longitudinal sectional view of a regenerative furnace with the combustion-chamber and the heating-chambers placed in a vertical position therein. Fig. 2 is a horizontal sectional view on the line $x\ x$ of Fig. 1, in which vertical and horizontal heating-chambers are placed. Fig. 3 is a sectional end view taken on the line $y\ y$, Fig. 1, in which the chambers are shown as placed at an angle.

A is the furnace, consisting of a combustion-chamber, B, provided with air and gas regenerators at each end.

The particular arrangement of the air and gas regenerators, which are located above the floor-level, and are embraced under the same roof with the combustion-chamber, forms no part of my invention. Neither do I wish to confine myself to this particular kind of a regenerator-furnace, as other styles may be used to advantage in carrying out my invention. This particular construction of furnace, however, I find well adapted for my use, as it enables me to elevate the combustion-chamber so that the compartments or chambers in which the articles are annealed can extend through the combustion-chamber, and affords facilities for passing the articles or the boxes or flasks containing the articles down or up through the chambers in the combustion-furnace, as will more fully appear.

C indicates the gas and D the air regenerating chambers, which are filled with the ordinary checker-work or piles of fire-brick. The gas-regenerators communicate with the gas-producers by means of suitable pipes, and the air is also led to the air-regenerators by suitable pipes, the pipes being provided with suitable valves for controlling and giving direction to the flow of gas and air, as is the usual practice in this class of furnaces. The gas enters the combustion-chamber through the ports A', while the heated air is brought in through the channels B' above the gas-ports.

B is the combustion or heating chamber, which is elevated a suitable distance above the ground, or the ground may be excavated beneath the combustion-chamber, so as to form a pit, E, and make room for the workmen to stand underneath and handle the articles, boxes, or flasks as they are raised or lowered through the floor of the combustion-chamber and through the compartments.

F, G, and H indicate the chambers or compartments in which the articles to be annealed are placed. The walls of the chambers are made of fire-clay or other refractory or heat-resisting material, and open at one or both ends through the walls of the combustion-chamber. The chambers or compartments F are placed in the combustion-chamber in a vertical position, and communicate with openings *a b* in the bottom and top of said chamber, the openings *a* being provided with suitable fire-clay plugs or stoppers, so as to exclude the air from the chambers, while the openings *b* are provided with hinged or sliding doors protected with a lining of fire-brick.

The articles to be treated are placed in the chamber F either loose or confined in boxes or flasks.

In Fig. 1 I have shown a flask, I, within the chamber or compartment F, and, as before intimated, the articles to be annealed or otherwise treated are placed in the flask or box and lowered through the top or raised through the bottom of the combustion-chamber into the compartment, the openings *a b* are closed, and the articles are removed from the oxidizing effect of the air.

In Fig. 2 I have shown the chambers or compartments G extending horizontally across the combustion-chamber with one end opening out through the walls of the furnace. Both ends may open out through the furnace-wall, and the articles, or boxes or flasks containing the articles, put in at one end, and when sufficiently heated taken out at the other end. These chambers G may be raised or elevated a short distance above the bottom of the combustion-chamber, so as to allow the heat or products of combustion to pass underneath. The bottoms of the chambers or compartments G may be placed on a level with the floor of the building in which the furnace is built, thereby making it very easy to fill the compartments, whether the material to be treated is in bulk, packages, boxes, or flasks.

In Fig. 3 I have shown the compartments placed in the combustion-chamber at an angle, the upper ends of which open out through the side of the furnace near the arch or roof, while the lower end of said chambers open through the bottom of the combustion-chamber, the openings in both ends being closed by any suitable means. This is a very desirable form of construction for small articles which are to be annealed or treated in bulk, as they can be charged in at the opening in the top and gradually withdrawn through the opening in the bottom.

The shape and arrangement of the compartments may be varied to suit the requirements of the work to be done and the articles to be annealed or otherwise treated—as, for example, in the treatment of sheet-iron flat and wide compartments may be arranged in the combustion-chamber, so as to allow the products of combustion to pass freely around the compartments and heat them uniformly on all sides. This manner of construction and method of operation enables me to heat the compartments to any desired degree of temperature with the articles to be treated therein, while at the same time the air and gases are excluded from the articles, and they are not subjected to an oxidizing process, and when the charge in the compartments is properly treated or annealed it can be removed and immediately replaced by another charge without letting the furnace cool down or materially affecting the temperature of the same, which is quite a saving in time, fuel, and repairs on the furnace.

The articles to be treated can be raised to the required degree of temperature in a comparatively short time, and then removed, with the boxes or flasks which contain them, to a pit, and are covered with sand in the usual manner and allowed to gradually cool down, thus reducing the time of the annealing process in malleable iron from two or three weeks as now practiced to three or four days.

By the use of a regenerative furnace I can maintain a uniform and high degree of heat. The heat is distributed on all sides of the compartments, and I am enabled to give a uniform temper or treatment to all the articles.

The furnace constructed as described is adapted to the heating of high carbon, cast-steel ingots, blooms or billets, as it prevents oxidation or the liability of overheating or burning them. It is also well adapted to be used as a soaking-pit for Bessemer ingots, as they can be kept at any heat desired for rolling for an indefinite time without loss by oxidation.

The furnace is specially adapted for annealing sheet-iron, horseshoes, wire, nails, screws, nuts, and bolts, car-wheels, files, blanks for all kinds of tools, and in the manufacture of malleable iron there is a great saving of time and expense. It is also well adapted to carbureting cast-iron, wrought-iron, or steel of any grade, and as a heating-furnace for hardening, case-hardening, all kinds of metal.

The gas and air ports may be arranged to enter the combustion or heating chamber at any desired point, and the furnace may be made of any desirable shape to accomplish any special work which this furnace may be built to do, and the gas used as a fuel may be either natural or artificial.

Having thus described my invention, what I claim, and desire to secure by Letters Patent, is—

1. A regenerative furnace for annealing glass and treatment of metals the combustion or heating chamber of which is provided with one or more fire-resisting and air-tight compartments for receiving the articles or the boxes or flasks containing the articles to be annealed or treated, as set forth.

2. A regenerator-furnace for annealing or tempering glass and annealing and treating metals the combustion-chamber of which is provided with one or more compartments which extend through said combustion-chamber, whereby the articles or the boxes or flasks containing the articles can be introduced at one end and removed at the other.

3. A regenerator-furnace for annealing or tempering glass and annealing and treating metals the combustion-chamber of which is provided with one or more vertical or inclined compartments extending to and opening through the roof or wall and floor of the combustion-chambers, and suitable doors or lids for closing the ends of said compartments, as set forth.

In testimony whereof I affix my signature in presence of two witnesses.

JOSEPH A. TATRO.

Witnesses:
WINFIELD S. MOORE,
L. W. SINSABAUGH.